(12) United States Patent
Kuriki et al.

(10) Patent No.: US 8,835,048 B2
(45) Date of Patent: Sep. 16, 2014

(54) POWER STORAGE DEVICE

(75) Inventors: Kazutaka Kuriki, Kanagawa (JP);
Kiyofumi Ogino, Kanagawa (JP);
Tomokazu Yokoi, Kanagawa (JP);
Makoto Ishikawa, Kanagawa (JP);
Toshihiko Takeuchi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 489 days.

(21) Appl. No.: 13/153,503

(22) Filed: Jun. 6, 2011

(65) Prior Publication Data
US 2011/0305950 A1 Dec. 15, 2011

(30) Foreign Application Priority Data
Jun. 11, 2010 (JP) ................. 2010-133467

(51) Int. Cl.
*H01M 4/64* (2006.01)
*H01G 9/042* (2006.01)
*H01M 10/04* (2006.01)
*H01M 10/0525* (2010.01)
*H01M 4/66* (2006.01)
*H01M 4/134* (2010.01)
*H01G 11/26* (2013.01)
*H01M 4/02* (2006.01)

(52) U.S. Cl.
CPC .......... *H01G 11/26* (2013.01); *H01M 10/0525* (2013.01); *H01M 4/667* (2013.01); *H01M 4/134* (2013.01); *H01M 4/661* (2013.01); *Y02E 60/13* (2013.01); *Y02E 60/122* (2013.01); *H01M 2004/025* (2013.01)
USPC .......................... 429/211; 361/500

(58) Field of Classification Search
USPC .......................... 429/211; 361/500
See application file for complete search history.

(56) References Cited

U.S. PATENT DOCUMENTS

| 3,796,598 A | 3/1974 | Gejyo et al. |
| 4,155,781 A | 5/1979 | Diepers |
| 5,338,625 A | 8/1994 | Bates et al. |

(Continued)

FOREIGN PATENT DOCUMENTS

| JP | 2001-210315 | 8/2001 |
| JP | 2002-083594 | 3/2002 |

(Continued)

OTHER PUBLICATIONS

International Search Report (Application No. PCT/JP2011/062744) Dated Aug. 30, 2011.

(Continued)

*Primary Examiner* — Karie O'Neill Apicella
(74) *Attorney, Agent, or Firm* — Nixon Peabody LLP; Jeffrey L. Costellia

(57) ABSTRACT

An electrode for a power storage device with less deterioration due to charge and discharge and a power storage device using the electrode are provided. In the electrode for a power storage device and the power storage device, a region including a metal element which functions as a catalyst is selectively provided over a current collector, and then, an active material layer is formed. By selectively providing the region including the metal element, a whisker can be effectively generated in the active material layer over the current collector, and the whisker generation region can be controlled. Accordingly, the discharge capacity can be increased and the cycle characteristics can be improved.

26 Claims, 9 Drawing Sheets

(56) References Cited

U.S. PATENT DOCUMENTS

| | | | |
|---|---|---|---|
| 6,451,113 | B1 | 9/2002 | Givargizov |
| 6,685,804 | B1 | 2/2004 | Ikeda et al. |
| 6,844,113 | B2 | 1/2005 | Yagi et al. |
| 6,887,511 | B1 | 5/2005 | Shima et al. |
| 7,015,496 | B2 | 3/2006 | Ohnuma et al. |
| 7,192,673 | B1 | 3/2007 | Ikeda et al. |
| 7,235,330 | B1 | 6/2007 | Fujimoto et al. |
| 7,241,533 | B1 | 7/2007 | Ikeda et al. |
| 7,410,728 | B1 | 8/2008 | Fujimoto et al. |
| 7,794,881 | B1 | 9/2010 | Fujimoto et al. |
| 2005/0244324 | A1 | 11/2005 | Hatta et al. |
| 2007/0007239 | A1 | 1/2007 | Lee et al. |
| 2009/0117462 | A1 | 5/2009 | Okazaki et al. |
| 2009/0136847 | A1* | 5/2009 | Jeong et al. ............... 429/218.1 |
| 2009/0317726 | A1 | 12/2009 | Hirose et al. |
| 2010/0086837 | A1* | 4/2010 | Asari et al. ............... 429/94 |
| 2010/0178564 | A1 | 7/2010 | Asari et al. |
| 2010/0209784 | A1 | 8/2010 | Yamazaki et al. |
| 2010/0266898 | A1* | 10/2010 | Yamamoto et al. ........... 429/220 |
| 2011/0151290 | A1 | 6/2011 | Cui et al. |
| 2011/0266654 | A1* | 11/2011 | Kuriki et al. ............... 257/532 |
| 2012/0003383 | A1 | 1/2012 | Furuno |
| 2012/0328962 | A1 | 12/2012 | Takeuchi et al. |

FOREIGN PATENT DOCUMENTS

| | | |
|---|---|---|
| JP | 2003-246700 | 9/2003 |
| JP | 2004-281317 | 10/2004 |
| JP | 2008-103118 | 5/2008 |
| JP | 2009-134917 | 6/2009 |
| JP | 2010-262752 A | 11/2010 |
| WO | WO-2008/090876 A1 | 7/2008 |
| WO | WO-2009/125540 A1 | 10/2009 |

OTHER PUBLICATIONS

Written Opinion (Application No. PCT/JP2011/062744) Dated Aug. 30, 2011.

Li-Feng Cui et al., "Crystalline-Amorphous Core-Shell Silicon Nanowires for High Capacity and High Current Battery Electrodes", Nano Lett. (Nano Letters), 2009, vol. 9, No. 1, pp. 491-495.

T. I. Kamins et al., "Ti-catalyzed Si nanowires by chemical vapor deposition: Microscopy and growth mechanisms", J. Appl. Phys. (Journal of Applied Physics), Jan. 15, 2001, vol. 89, No. 2, pp. 1008-1016.

Hideo Kohno et al., "Silicon Nanoneedles Grown by a Simple Thermal Treatment Using Metal-Sulfur Catalysts", Jpn. J. Appl. Phys. (Japanese Journal of Applied Physics), Feb. 2002, vol. 41, Part 1, No. 2A, pp. 577-578.

\* cited by examiner

POWER STORAGE DEVICE

TECHNICAL FIELD

The present invention relates to a power storage device and a method for manufacturing the power storage device.

The power storage device refers to any element or device which has a function of storing power.

BACKGROUND ART

In recent years, power storage devices such as lithium-ion secondary batteries, lithium-ion capacitors, and air cells have been developed.

An active material is formed over a surface of a current collector, so that an electrode for a power storage device is formed. As the active material, a material which can store and release ions functioning as carriers, such as carbon or silicon, is used. For example, silicon or phosphorus-doped silicon, which has larger theoretical capacity than carbon, excels at increasing of the capacity of a power storage device. However, silicon generates stress due to volume expansion when charged, which causes the active material to be separated from the current collector, for example, so that the charge-discharge cycle characteristics of the power storage device are deteriorated. Thus, some techniques for suppressing the effect of the volume expansion of the active material have been proposed (for example, Patent Document 1).

REFERENCE

Patent Document 1: Japanese Published Patent Application No. 2009-134917

DISCLOSURE OF INVENTION

An object of one embodiment of the present invention is to provide an electrode for a power storage device with less deterioration due to charge and discharge and/or a power storage device using the electrode. An object of one embodiment of the present invention is to provide a power storage device which has large capacity and high endurance.

One embodiment of the present invention is a power storage device including a current collector including a first metal element, a plurality of metal layers which is provided over the current collector and includes a second metal element which is different from the first metal element, and an active material layer provided over the current collector and the metal layers. The active material layer includes a whisker group selectively in a region which is in contact with the metal layer and the interval between the metal layers adjacent to each other is equal to or greater than 2 times and less than or equal to 4 times as large as the width of the metal layer.

In the above-described power storage device, it is preferable that the first metal element be tungsten or iron and the second metal element be nickel or titanium.

One embodiment of the present invention is a power storage device including a current collector including a first metal element, a plurality of metal layers which is provided over the current collector and includes a second metal element which is different from the first metal element, and an active material layer provided over the current collector and the metal layers. The active material layer includes a whisker group selectively in a region which is in contact with the current collector and the maximum width of the metal layer is equal to or greater than 2 times and less than or equal to 4 times as large as the interval between the metal layers adjacent to each other.

In the above-described power storage device, it is preferable that the first metal element be nickel or titanium and the second metal element be tungsten or iron.

In any of the above-described power storage devices, it is preferable that the metal layer be rectangular or conical.

In any of the above-described power storage devices, it is preferable that the whisker group include silicon.

In this specification and the like, a whisker is protruded (whisker-like) crystalline silicon, and the directions of extension (i.e., the directions of axes) of the protrusions in the plurality of whiskers may be ununiform. Alternatively, the directions of extension (i.e., the directions of axes) of protrusions in the plurality of whiskers may be the normal direction to the current collector. The "whisker" in this specification and the like may include a whisker group (a plurality of whiskers).

The active material layer includes the whisker group, whereby the surface area can be increased and the discharge capacity can be increased.

A mixed region of a metal element and silicon may be formed in a region of the current collector in an interface with the active material layer and its vicinity or in a region of the metal layer in an interface with the active material layer and its vicinity. The mixed region of the metal element and silicon can prevent a low-density region (rough region) from being formed between the current collector and the active material layer or between the metal layer and the active material layer, so that interface characteristics between the active material layer and the layer in contact with the active material layer can be improved.

A metal oxide region may be provided in the current collector or the metal layer between the mixed region and the active material layer. The metal oxide region is formed using a metal oxide of the metal element included in the current collector or the metal layer. The metal oxide region can be formed using an oxide semiconductor or an oxide conductor, whereby resistance between the current collector and the active material layer or resistance between the metal layer and the active material layer can be reduced, which can further improve the discharge capacity, as compared to the case where the metal oxide region is an insulator.

According to one embodiment of the present invention, an electrode for a power storage device with less deterioration due to charge and discharge can be provided. Further, according to one embodiment of the present invention, a power storage device which has large capacity and high endurance can be manufactured.

BEST MODE FOR CARRYING OUT THE INVENTION

Figure 1A:
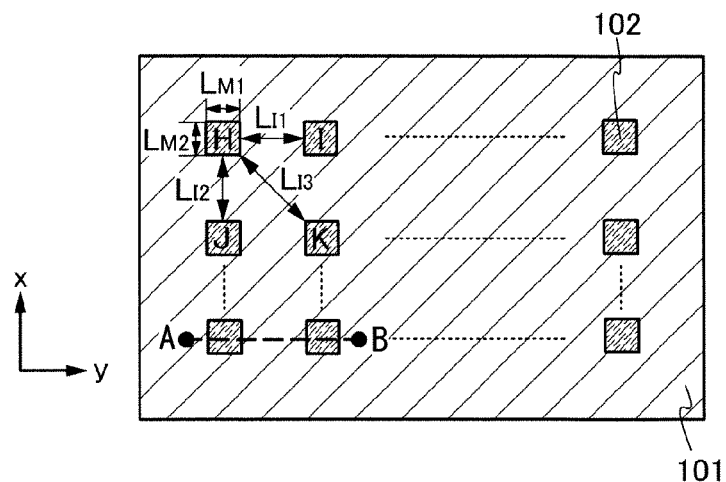
FIGS. 1A and 1B are a top view and a cross-sectional view illustrating a structure of an electrode for a power storage device.

Hereinafter, examples of embodiments of the present invention will be described with reference to drawings. Note that the present invention is not limited to the following description, and it will be easily understood by those skilled in the art that various changes and modifications can be made without departing from the spirit and scope of the present invention. Thus, the present invention should not be interpreted as being limited to the following description of the embodiments. In description with reference to the drawings, in some cases, reference numerals are used in common for portions throughout the drawings. Further, in some cases, similar parts are denoted by the same hatching pattern, and are not necessarily designated by reference numerals.

Embodiment 1

In Embodiment 1, according to one embodiment of the present invention, an electrode for a power storage device and a method for manufacturing the electrode will be described using FIGS. 1A and 1B, 2A and 2B, and 3A and 3B, and FIG. 4.

<Structure Example 1>

Figure 1B:
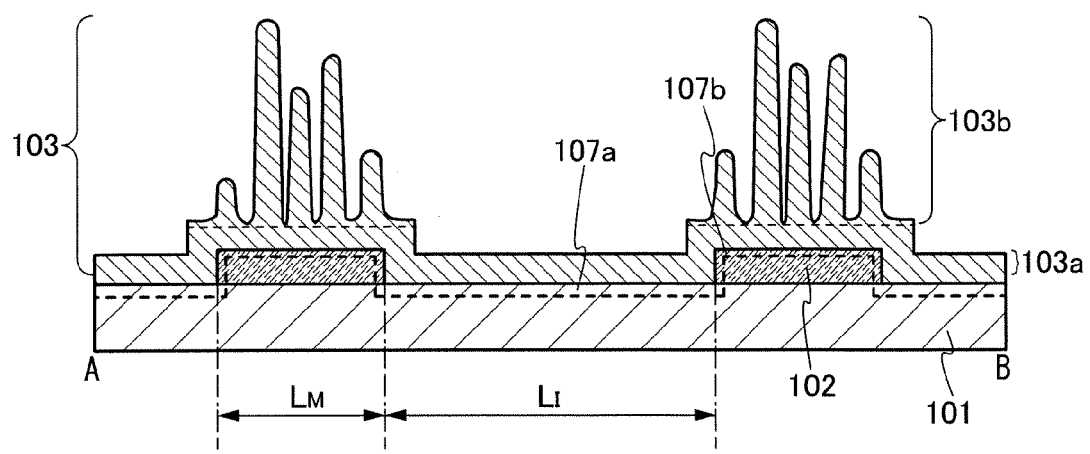

FIG. 1A is one example of a top view of an electrode for a power storage device, and FIG. 1B is a cross-sectional view along line A-B in FIG. 1A. An active material layer 103 is omitted in FIG. 1A.

The electrode for a power storage device shown in FIGS. 1A and 1B is manufactured as follows: a metal layer is formed over a current collector 101 and is selectively etched to form a plurality of metal layers 102; and a crystalline silicon layer is formed as the active material layer 103 over the current collector 101 and the metal layers 102 by a thermal CVD (Chemical Vapor Deposition) method, preferably a Low Pressure Chemical Vapor Deposition (LPCVD) method.

In the electrode shown in FIGS. 1A and 1B, the metal layers 102 are disposed such that an interval $L_I$ between the metal layers 102 which are adjacent to each other is equal to or greater than 2 times and equal to or less than 4 times as large as a width $L_M$ of the metal layer 102 (the width of the metal layer 102 in a direction parallel to $L_I$). The width of the metal layer is preferably equal to or greater than 1 μm and equal to or less than 7 μm, far preferably equal to or greater than 3 μm and equal to or less than 5 μm.

In FIGS. 1A and 1B, the metal layer 102 is a layer including a metal element for promoting the crystal growth of the active material layer. A metal element which functions as a catalyst for promoting the crystal growth of the active material layer 103 can be used as the metal element included in the metal layer 102; for example, nickel, titanium, or the like can be used. It is preferable that the metal layer 102 have a thickness of 100 nm to 1000 nm. Further, in order to increase a region where a crystal nucleus is generated, it is far preferable that the plurality of metal layers 102 be provided with intervals therebetween.

In the case where the plurality of metal layers 102 is provided over the current collector 101 as shown in FIG. 1A, any two adjacent metal layers 102 have an interval equal to or greater than 2 times and equal to or less than 4 times as large as a width of the metal layer 102 (the width of the metal layer 102 in a direction parallel to the line segment between two adjacent metal layers), therebetween. For example, in FIG. 1A, an interval $L_{I1}$ between the top-left metal layer 102 (hereinafter referred to as a metal layer 102H) and the metal layer 102 (hereinafter referred to as a metal layer 102I) which is adjacent to the metal layer 102H in the x-axis direction is equal to or greater than 2 times and equal to or less than 4 times as large as a width $L_{M1}$ of the metal layer 102H. In addition, an interval $L_{I2}$ between the metal layer 102H and the metal layer 102 (hereinafter referred to as a metal layer 102J) which is adjacent to the metal layer 102H in the y-axis direction is equal to or greater than 2 times and equal to or less than 4 times as large as a width $L_{M2}$ of the metal layer 102H. Furthermore, an interval $L_{I3}$ between the metal layer 102H and the metal layer 102 (hereinafter referred to as a metal layer 102K) which is adjacent to the metal layer 102H in the diagonal direction of the metal layer 102H is equal to or greater than 2 times and equal to or less than 4 times as large as a width (not shown) in the diagonal direction of the metal layer 102H. As shown in FIGS. 1A and 1B, it is preferable that the metal layer 102 be rectangular for efficient arrangement of the metal layers 102. Further, it is far preferable that each metal layer 102 have the same or substantially the same widths in the x-axis and y-axis directions (for example, have a columnar shape whose bottom surface is square) so that the metal layers 102 can be arranged in high density over the current collector 101 with interval distances therebetween.

The current collector 101 functions as a current collector of the electrode. Thus, a conductive member having a foil shape, a plate shape, or a net shape is used. The current collector 101 can be formed using a metal element having high conductive property. It is preferable that the current collector 101 be formed using a metal element having no effect of promoting the crystal growth of the active material layer (that is, a metal element which does not function as a catalyst) so that a region where a crystal is grown in the active material layer 103 can be controlled to a region which is in contact with the metal layer 102. Tungsten, iron, or the like can be used as such a metal element.

The metal layer is formed over the current collector 101 and is etched to be patterned, whereby a generation region of a crystal nucleus of the active material layer 103 over the current collector 101 can be controlled. The metal layer is etched while being stacked on the current collector 101, and therefore, it is preferable that the metal element in the current collector 101 and the metal element in the metal layer have different etching rates. Thin films including different metal elements may be stacked to form the metal layer 102. In that case, at least the metal element in the layer which is in contact with the current collector 101 contains a metal element which has a different etching rate from the metal element included in the current collector 101.

In this embodiment, the active material layer 103 is a crystalline silicon layer. The crystalline silicon layer can be formed by a LPCVD method, for example. For example, the crystalline silicon layer can be formed as follows: heating is performed at a temperature higher than 550° C. and lower than or equal to the temperature which an LPCVD apparatus and the current collector 101 can withstand, preferably higher than or equal to 580° C. and lower than 650° C., and a deposition gas containing silicon is used as a source gas. Examples of the deposition gas containing silicon include silicon hydride, silicon fluoride, and silicon chloride; typically, $SiH_4$, $Si_2H_6$, $SiF_4$, $SiCl_4$, $Si_2Cl_6$, and the like. One or more of a rare gas such as helium, neon, argon, and xenon, nitrogen, and hydrogen may be mixed in the source gas.

The active material layer 103 includes oxygen or the like as an impurity owing to a chamber of the LPCVD apparatus in some cases.

An impurity element imparting one conductivity type, such as phosphorus or boron, may be added to the crystalline silicon layer which functions as the active material layer 103. Such a crystalline silicon layer to which the impurity element imparting one conductivity type, such as phosphorus or boron, is added has higher electrical conductivity, so that the electrical conductivity of the electrode can be increased. Accordingly, the discharge capacity can be further increased.

In the case where the LPCVD method is used to form the crystalline silicon layer as the active material layer 103, a low-density region is not formed between the current collector 101 and the active material layer 103 and/or between the metal layer 102 and the active material layer 103, whereby electron transfer in the interface between the active material layer 103 and the layer which is in contact with the active material layer 103 is facilitated and the adhesion between the current collector 101 and the active material layer 103 and/or between the metal layer 102 and the active material layer 103 can be increased. This is because active species of the source gas are supplied to the crystalline silicon layer in depositing the crystalline silicon layer, so that silicon diffuses into the current collector 101 and the metal layer 102 from the crystalline silicon layer, whereby even if a region (rough region) being in short of silicon is temporarily formed, the active species of the source gas are continuously supplied to the region, so that a low-density region is unlikely to be formed in the crystalline silicon layer. In addition, since the crystalline silicon layer is formed over the current collector 101 and the metal layer 102 by vapor-phase growth, throughput can be improved.

As shown in FIG. 1B, in a region of the current collector 101 in the vicinity of a surface on which the active material layer 103 is formed, a first mixed region 107a of the metal element included in the current collector 101 and silicon may be formed. Further, in a region of the metal layer 102 in the vicinity of a surface on which the active material layer 103 is formed, a second mixed region 107b of the metal element included in the metal layer 102 and silicon may be formed. The first mixed region 107a or the second mixed region 107b is formed by diffusing silicon included in the crystalline silicon layer into the current collector 101 or the metal layer 102 by heating in the LPCVD method for forming the crystalline silicon layer as the active material layer 103. The interface between the first mixed region 107a and the second mixed region 107b is not clear. Thus, the first mixed region 107a or the second mixed region 107b may be a mixed region of the metal element included in the current collector 101, the metal element included in the metal layer 102, and silicon.

In the case where the current collector 101 includes tungsten or iron, silicide of that metal element, specifically, tungsten silicide or iron silicide may be formed in the first mixed region 107a.

In the case where the metal layer 102 includes nickel or titanium, silicide of that metal element, specifically, nickel silicide or titanium silicide may be formed in the second mixed region 107b.

The first mixed region 107a or the second mixed region 107b includes oxygen or the like as an impurity owing to a chamber of the LPCVD apparatus in some cases.

Such a mixed region of the metal element and silicon provided between the active material layer 103 and the current collector 101 or the metal layer 102 enables the resistance in the interface between the active material layer 103 and the current collector 101 or between the active material layer 103 and the metal layer 102 to be decreased, leading to improvement in the electrical conductivity of the electrode. In addition, the adhesion between the active material layer 103 and the current collector 101 or the metal layer 102 can be increased, so that degradation of the power storage device can be suppressed.

The active material layer 103 is formed to cover the current collector 101 and the metal layer 102. The active material layer 103 includes a crystalline silicon region 103a and a crystalline silicon region 103b including a whisker group, formed over the crystalline silicon region 103a. The interface between the crystalline silicon region 103a and the crystalline silicon region 103b is not clear.

The crystalline silicon region 103b includes the whisker group and is formed selectively in a region which is in contact with the metal layer 102. This is because the metal element included in the metal layer 102 has a function of promoting the crystal growth of the active material layer. The shape of the whisker is not limited to a whisker-like shape and may be a columnar shape such as a cylinder shape or a prism shape, or a needle-like shape such as a cone shape or a pyramid shape. The tip of the whisker may be curved. The diameter of the whisker is equal to or greater than 50 nm and equal to or less than 10 μm, preferably equal to or greater than 500 nm and equal to or less than 3 μm. The length of the whisker is equal to or greater than 0.5 μm and equal to or less than 1000 μm, preferably equal to or greater than 1 μm and equal to or less than 100 μm.

The length of the whisker means the size of the whisker in the growth direction (longitudinal direction). For example, the length means a distance between the bottom surface and the top surface of the whisker when being supposed to have a columnar shape; the length means a distance between the vertex and the bottom surface of the whisker when being supposed to have a needle-like shape. Lengths of the plurality of whiskers are not necessarily equal to each other.

FIG. 1B illustrates the case where the longitudinal directions of the whiskers are one direction, e.g., the normal direction to the surface of the current collector 101. The case where the longitudinal directions of the whiskers are one direction includes in its category, the case where the longitudinal directions of the whiskers substantially coincide with the normal direction to the surface of the current collector 101, and it is preferable that the difference between any two directions be typically within 5°.

The longitudinal directions of the whiskers are not necessarily one direction but may be different directions. For example, the longitudinal directions may be the normal direction to the surface of the current collector 101 and a second direction which is different from the normal direction.

In FIGS. 1A and 1B, the whiskers grow with the use of the metal element included in the metal layer 102 as a catalyst. Thus, as shown in FIG. 1B, the whiskers are selectively formed selectively in a region which is in contact with the metal layer 102. In this manner, by selectively providing the metal layer 102 which functions as a catalyst, a region where the whisker is generated (the region can also be referred to as a region of nucleation of crystalline silicon) over the current collector 101 can be effectively controlled. The current collector 101 may be formed using a metal element which does not have a function as a catalyst, to thereby further increase the above-described effect.

In the case where silicon is used for an electrode of a lithium-ion battery, lithium doping or de-doping makes the volume of silicon expand about 4 times, so that expanded silicon may interfere with each other to detach silicon from the current collector, for example. However, as shown in FIG.

1B, the metal layer 102 which functions as a catalyst is selectively provided to control the generation region of a whisker group, whereby a whisker is prevented from being formed over an entire surface of the active material layer 103, so that volume expansion of the crystalline silicon layer which functions as the active material layer 103 can be suppressed. Further, the interval between the metal layers 102 adjacent to each other is equal to or greater than 2 times and equal to or less than 4 times as large as the width of the metal layer 102, whereby an effect of fourfold expansion of a whisker formed in contact with the metal layer 102 on a whisker formed in contact with the metal layer 102 adjacent to the above-described metal layer 102 can be suppressed. Accordingly, whisker break and/or detachment due to contact between expanded whiskers or the like can be suppressed. In this manner, cycle characteristics of the power storage device can be improved.

<Deformation Example 1>

Figure 2A:
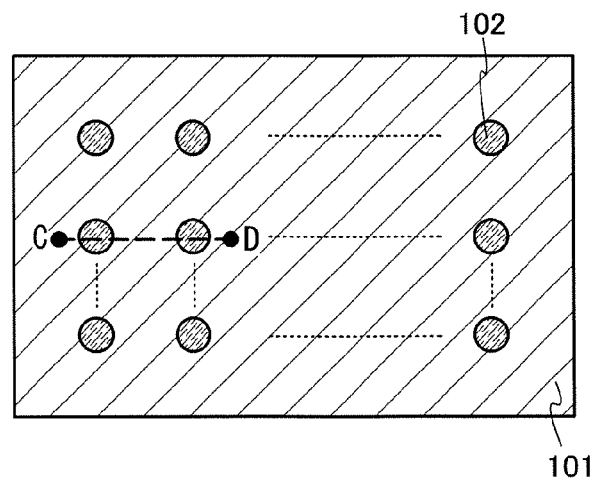
FIGS. 2A and 2B are a top view and a cross-sectional view illustrating a structure of an electrode for a power storage device.
Figure 2B:
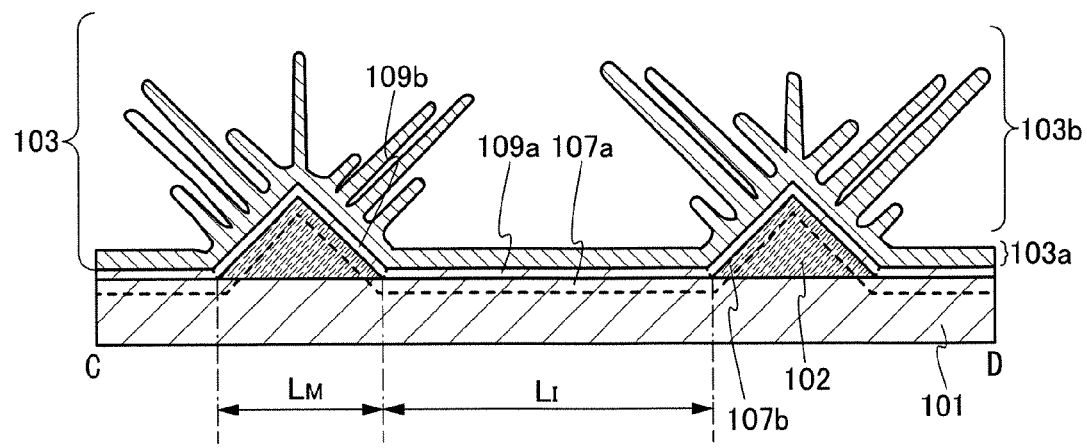

The structure of the electrode of this embodiment is not limited to that shown in FIGS. 1A and 1B. For example, FIGS. 2A and 2B illustrate a deformation example of FIGS. 1A and 1B. The structure of FIGS. 2A and 2B can be combined with the structure of FIGS. 1A and 1B as appropriate.

FIG. 2A is one example of a top view of an electrode for a power storage device, and FIG. 2B is a cross-sectional view along line C-D in FIG. 2A. The active material layer 103 is omitted in FIG. 2A.

One difference between the electrode shown in FIGS. 2A and 2B and the electrode shown in FIGS. 1A and 1B is the pattern shape of the metal layer 102. In FIGS. 2A and 2B, the shape of the metal layer 102 is conical. With such a needle-like shape such as the cone shape, the growth of the whisker in the active material layer 103 is concentrated in the side surface of the metal layer 102, so that the growth direction of the whisker can be controlled easily, which is preferable. The forgoing description can be referred to for the arrangement, material, and the like of the metal layer 102, and thus detailed description thereof is omitted below.

In the electrode shown in FIGS. 2A and 2B, a first metal oxide region 109a may be formed using an oxide of the metal element included in the current collector 101, in a region which is part of the current collector 101 between the first mixed region 107a and the active material layer 103; a second metal oxide region 109b may be formed using an oxide of the metal element included in the metal layer 102, in a region which is part of the metal layer 102 between the second mixed region 107b and the active material layer 103. Such a metal oxide region is formed, in some cases, by oxidizing the current collector 101 or the metal layer 102 with oxide owing to a chamber of an LPCVD apparatus by heating in the LPCVD method for forming the crystalline silicon layer as the active material layer 103. In the case where the first metal oxide region 109a and the second metal oxide region 109b are formed, the interface between them is not clear; a metal oxide region which includes the first metal element included in the current collector 101 and the second metal element included in the metal layer 102 may be formed. The formation of such a metal oxide region can be controlled by filling the chamber with a rare gas such as helium, neon, argon, or xenon, or a nitrogen gas in the LPCVD method for forming the crystalline silicon layer.

In the case where the current collector 101 includes iron or tungsten, an iron oxide region or a tungsten oxide region is formed as the first metal oxide region 109a. In the case where the metal layer 102 includes nickel or titanium, a nickel oxide region or a titanium oxide region is formed as the second metal oxide region 109b. Such an oxide conductor such as titanium oxide or tungsten oxide formed as the first metal oxide region 109a or the second metal oxide region 109b enables the resistance between the active material layer 103 and the current collector 101 or between the active material layer 103 and the metal layer 102 to be decreased, leading to improvement in the electrical conductivity of the electrode. Accordingly, the discharge capacity can be further increased.

<Deformation Example 2>

Figure 3A:
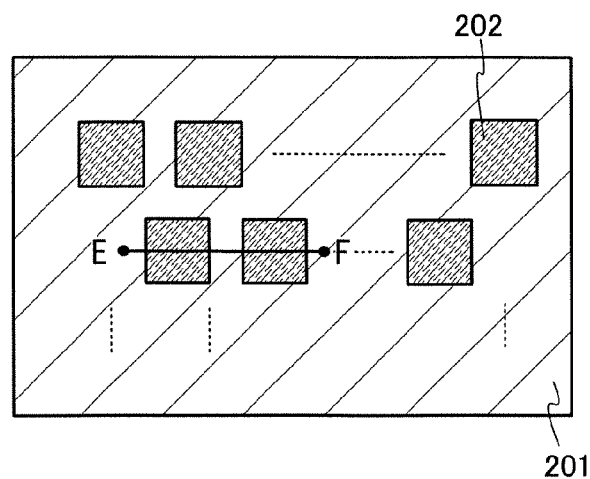
FIGS. 3A and 3B are a top view and a cross-sectional view illustrating a structure of an electrode for a power storage device.
Figure 3B:
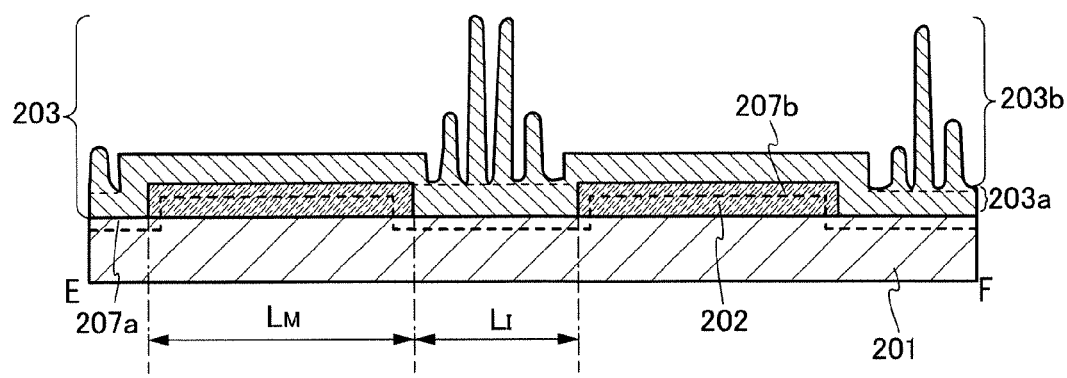

FIGS. 3A and 3B illustrate another deformation example of the structure of the electrode of this embodiment. The structure of FIGS. 3A and 3B can be combined with any of the structures of FIGS. 1A and 1B and FIGS. 2A and 2B as appropriate.

FIG. 3A is one example of a top view of an electrode for a power storage device, and FIG. 3B is a cross-sectional view along line E-F in FIG. 3A. The active material layer 103 is omitted in FIG. 3A.

One difference between the electrode shown in FIGS. 3A and 3B and the electrode shown in FIGS. 1A and 1B is the materials of the current collector and the metal layer. Specifically, a current collector 201 functions as the current collector of the electrode and includes a metal element for promoting the crystal growth of the active material layer in FIGS. 3A and 3B. As the metal element included in the current collector 201, a metal element which has high electrical conductivity and functions as a catalyst for promoting the crystal growth of an active material layer 203 can be used; for example, nickel, titanium, or the like can be used.

The active material layer 203 is formed to cover the current collector 201 and a metal layer 202. The active material layer 203 includes a crystalline silicon region 203a and a crystalline silicon region 203b including a whisker group, formed over the crystalline silicon region 203a. The interface between the crystalline silicon region 203a and the crystalline silicon region 203b is not clear.

In FIGS. 3A and 3B, it is preferable that the metal layer 202 be formed using a metal element having no effect of promoting the crystal growth of the active material layer (that is, a metal element which does not function as a catalyst); accordingly, a region where a crystal is grown in the active material layer 203 can be controlled to a region which is in contact with the current collector 201. Tungsten, iron, or the like can be used as such a metal element.

In the electrode shown in FIGS. 3A and 3B, the metal layers 202 are disposed such that an interval $L_I$ between the metal layers 202 which are adjacent to each other is equal to or greater than 2 times and equal to or less than 4 times as large as a width $L_M$ of the metal layer 202 (the width of the metal layer 202 in a direction parallel to $L_I$). The width of the metal layer 202 is preferably equal to or greater than 6 μm and equal to or less than 10 μm, far preferably equal to or greater than 3 μm and equal to or less than 5 μm.

In the case where the current collector 201 includes nickel or titanium, silicide of that metal element, specifically, nickel silicide or titanium silicide may be formed in the first mixed region 207a. In the case where the metal layer 202 includes tungsten or iron, silicide of that metal element, specifically, tungsten silicide or iron silicide may be formed in the second mixed region 207b.

As shown in FIG. 3A, the metal layers 202 may be disposed in a lattice manner over the current collector 201. Accordingly, the metal layers 202 can be arranged in high density over the current collector 201 with interval distances therebetween.

In FIGS. 3A and 3B, the whiskers grow with the use of the metal element included in the current collector 201 as a catalyst. Thus, as shown in FIG. 3B, the whiskers are selectively formed in a region which is in contact with the current collector 201. In this manner, by selectively providing the metal layer 202 which does not have a function as a catalyst over the current collector 201 which functions as a catalyst, a region where the whisker is generated (the region can also be referred to as a region of nucleation of crystalline silicon) over the current collector 201 can be effectively controlled.

Further, the width of the metal layer 202 is equal to or greater than 2 times and equal to or less than 4 times as large as the interval between the metal layers 202 adjacent to each other, whereby whisker break and/or detachment due to contact between expanded whiskers or the like can be suppressed even if a whisker formed in contact with the current collector 201 is expanded fourfold. In this manner, cycle characteristics of the power storage device can be improved.

Figure 9:
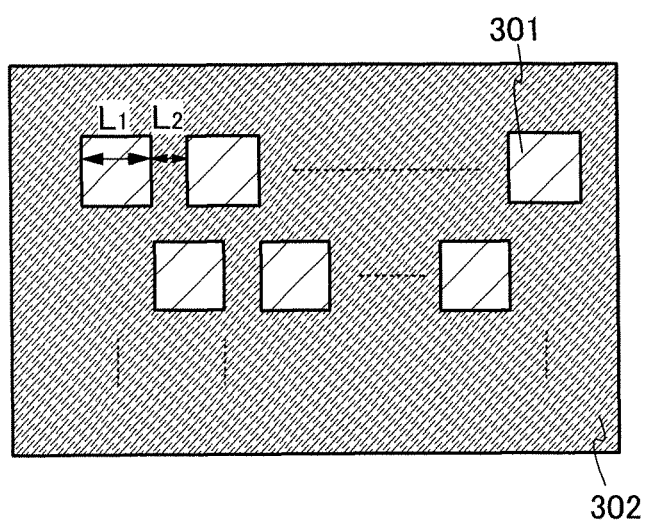
FIG. 9 is a top view illustrating a structure of an electrode for a power storage device.

In the case where a metal element for promoting the crystal growth of the active material layer is used for the current collector, as shown in FIG. 9, a metal layer including a metal element having no effect of promoting the crystal growth of the active material layer may be formed entirely over a current collector 301 and then etched selectively to form a metal layer 302 having a plurality of openings. In that case, the openings may be formed such that a width $L_1$ of each opening (a region where the current collector 301 is exposed by the etching of the metal layer) is equal to or greater than 2 times and equal to or less than 4 times as large as an interval $L_2$ between the openings which are adjacent to each other. The width of the opening is preferably equal to or greater than 6 μm and equal to or less than 10 μm, far preferably equal to or greater than 3 μm and equal to or less than 5 μm.

In the electrode for a power storage device described in this embodiment, selective provision of the metal layer over the current collector enables whiskers to be effectively generated in the active material layer and enables the generation region of the whiskers to be controlled. Accordingly, the discharge capacity of the electrode can be increased and the cycle characteristics can be increased. Further, a mixed region is preferably provided between the crystalline silicon layer and the current collector or the metal layer. The mixed region enables the interface resistance between the crystalline silicon layer and the current collector or the metal layer to be decreased and the adhesion therebetween can be increased, whereby degradation of the power storage device can be decreased.

Figure 4:
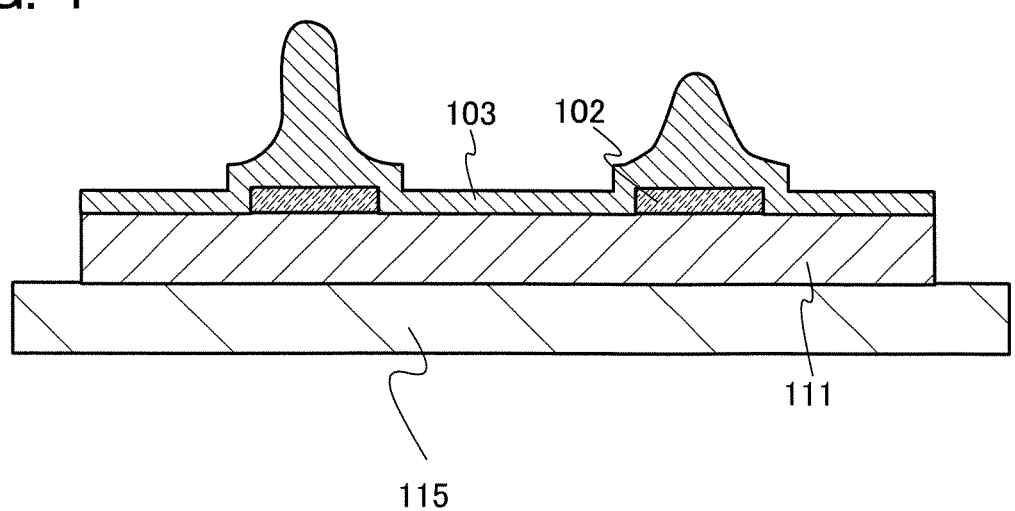
FIG. 4 is a cross-sectional view illustrating a structure of an electrode for a power storage device.

FIGS. 1A and 1B, 2A and 2B, and 3A and 3B illustrate the case where the current collector 101 or 201 is formed using a conductive member having a foil shape, a plate shape, or a net shape. As illustrated in FIG. 4, a current collector 111 can be formed by a sputtering method, an evaporation method, a printing method, an inkjet method, a CVD method, or the like as appropriate over a substrate 115.

As described above, the diameter of the whisker included in the active material layer 103 is preferably equal to or greater than 500 nm and equal to or less than 3 μm. Therefore, in the case where the metal layer 102 is formed using a metal element which functions as a catalyst and the width of the metal layer 102 is equal to or greater than 1 μm and equal to or less than 3 μm, one whisker is formed for one metal layer 102 in some cases as shown in FIG. 4.

In this manner, according to this embodiment, an electrode for a power storage device with large discharge capacity can be provided. This embodiment can be combined with any other embodiment.

Embodiment 2

In Embodiment 2, a structure of a power storage device will be described with reference to FIGS. 5A and 5B.

First, a structure of a secondary battery which is one example of a power storage device is described. Among secondary batteries, a lithium-ion battery using a metal oxide containing lithium, such as $LiCoO_2$, has a large discharge capacity and high safety. In this embodiment, a structure of a lithium-ion battery that is a typical example of a secondary battery is described.

Figure 5A:
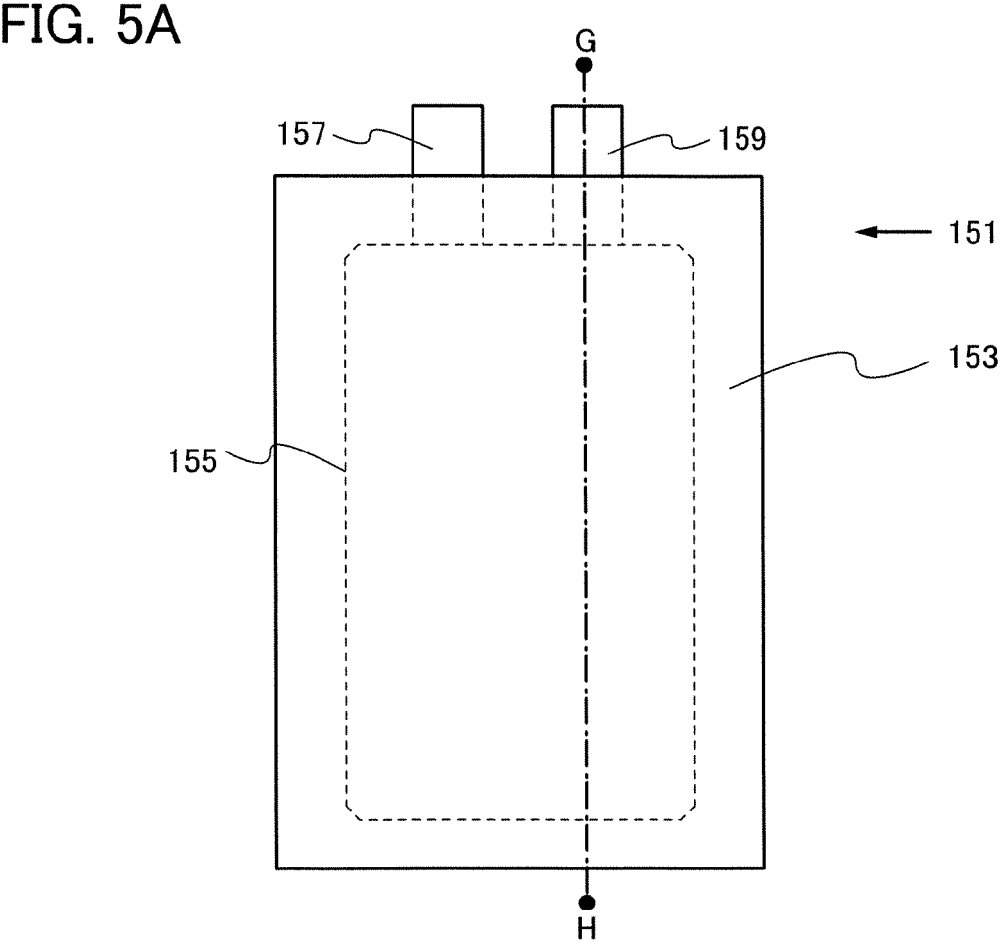
FIGS. 5A and 5B are a plan view and a cross-sectional view illustrating one embodiment of a power storage device.
Figure 5B:
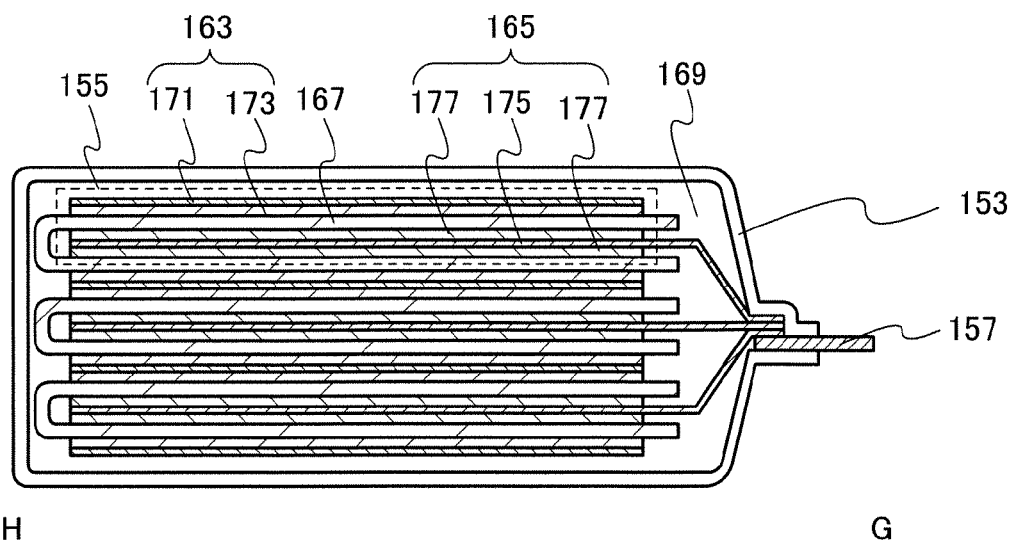

FIG. 5A is a plan view of a power storage device 151, and FIG. 5B is a cross-sectional view along line G-H in FIG. 5A.

The power storage device 151 illustrated in FIG. 5A includes a power storage cell 155 in an exterior member 153. Terminal portions 157 and 159 which are connected to the power storage cell 155 are also provided. For the exterior member 153, a laminate film, a polymer film, a metal film, a metal case, a plastic case, or the like can be used.

As illustrated in FIG. 5B, the power storage cell 155 includes a negative electrode 163, a positive electrode 165, a separator 167 between the negative electrode 163 and the positive electrode 165, and an electrolyte 169 filling the exterior member 153.

The negative electrode 163 includes a negative electrode current collector 171 and a negative electrode active material layer 173. The positive electrode 165 includes a positive electrode current collector 175 and a positive electrode active material layer 177. The negative electrode active material layer 173 is formed on one or both of the surfaces of the negative electrode current collector 171. The positive electrode active material layer 177 is formed on one or both of the surfaces of the positive electrode current collector 175.

The negative electrode current collector 171 is connected to the terminal portion 159. The positive electrode current collector 175 is connected to the terminal portion 157. Further, the terminal portions 157 and 159 each extend outside the exterior member 153.

Although a sealed thin power storage device is described as the power storage device 151 in this embodiment, power storage devices having a variety of structures such as a button power storage device, a cylindrical power storage device, or a rectangular power storage device can be provided. Further, although the structure where the positive electrode, the negative electrode, and the separator are stacked is described in this embodiment, a structure where a positive electrode, a negative electrode, and a separator are rolled may be employed.

The negative electrode current collector 171 can be formed using any current collector described in Embodiment 1.

The negative electrode active material layer 173 can be formed using the active material layer 103, which is formed using the crystalline silicon layer described in Embodiment 1. The crystalline silicon layer may be pre-doped with lithium. In addition, the active material layer 103 which is formed using the crystalline silicon layer can be formed with the negative electrode current collector 171 held by a frame-like susceptor in an LPCVD apparatus, whereby the active material layer 103 can be formed on both of the surfaces of the negative electrode current collector 171 at the same time, so that the number of manufacturing steps can be reduced.

Aluminum, stainless steel, or the like is used for the positive electrode current collector 175. The positive electrode current collector 175 may have a foil shape, a plate shape, a net shape, or the like.

The positive electrode active material layer 177 can be formed using $LiFeO_2$, $LiCoO_2$, $LiNiO_2$, $LiMn_2O_4$, $LiFePO_4$, $LiCoPO_4$, $LiNiPO_4$, $LiMn_2PO_4$, $V_2O_5$, $Cr_2O_5$, $MnO_2$, or any other lithium compound as a material. In the case where an alkaline metal ion other than lithium or an alkaline-earth metal ion is used as a carrier ion, an alkaline metal (e.g., sodium or potassium), an alkaline-earth metal (e.g., calcium, strontium, or barium), beryllium, or magnesium can be used instead of lithium, in the above-described lithium compound for the positive electrode active material layer 177.

As a solute of the electrolyte 169, a material in which lithium ions, i.e., carrier ions, can transfer and stably exist is used. Typical examples of the solute of the electrolyte include lithium salt such as $LiClO_4$, $LiAsF_6$, $LiBF_4$, $LiPF_6$, and $Li(C_2F_5SO_2)_2N$. In the case where carrier ions are alkali metal ions other than lithium ions or alkaline-earth metal ions, alkali metal salt such as sodium salt or potassium salt, alkaline-earth metal salt such as calcium salt, strontium salt, or barium salt, beryllium salt, magnesium salt, or the like can be used as the solute of the electrolyte 169, as appropriate.

As a solvent of the electrolyte 169, a material in which lithium ions, which are carrier ions, can transfer is used. As the solvent of the electrolyte 169, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like; one or more of these materials can be used. A gelled polymer can be used as the solvent of the electrolyte 169, thereby improving the safety against liquid leakage or the like. In addition, reduction in size and weight of the power storage device 151 can be achieved. Typical examples of gelled polymers include a silicon gel, an acrylic gel, an acrylonitrile gel, polyethylene oxide, polypropylene oxide, a fluorine-based polymer, and the like.

As the electrolyte 169, a solid electrolyte such as $Li_3PO_4$ can be used.

As the separator 167, an insulating porous material can be used. Typical examples of the separator 167 include cellulose (paper), polyethylene, and polypropylene.

With respect to a lithium-ion battery, the memory effect is small, the energy density is high, and the discharge capacity is large. In addition, the driving voltage of the lithium-ion battery is high. Accordingly, reduction in size and weight can be realized. Further, the lithium-ion battery does not easily degrade due to repetitive charge and discharge and can be used for a long time, which leads to cost reduction.

Next, a structure of a capacitor which is another example of a power storage device is described below. Typical examples of capacitors include a double-layer capacitor, a lithium-ion capacitor, and the like.

In the case of a capacitor, instead of the positive electrode active material layer 177 in the secondary battery in FIG. 5B, a material capable of reversibly occluding lithium ions and/or anions is preferably used. Typical examples of the positive electrode active material layer 177 include active carbon, a conductive polymer, and a polyacene organic semiconductor (PAS).

The lithium-ion capacitor has high efficiency of charge and discharge, capability of rapidly charge and discharge, and a long life with repetitive use.

Also in this capacitor, the electrode including the current collector and the active material layer described in Embodiment 1 can be used as the negative electrode, whereby a power storage device with large discharge capacity can be manufactured.

Power storage devices using the electrode of one embodiment of the present invention are not limited to the above-describe ones. For example, the electrode including the current collector and the active material layer described in Embodiment 1 can be used as a negative electrode of an air battery which is another embodiment of a power storage device. In that case also, a power storage device with large discharge capacity can be manufactured.

This embodiment can be combined with any other embodiment.

Embodiment 3

In Embodiment 3, an application embodiment of the power storage device described in Embodiment 2 is described with reference to FIG. 6.

The power storage device described in Embodiment 2 can be used in electronic devices, e.g., cameras such as digital cameras or video cameras, digital photo frames, mobile phones (also referred to as cellular phones or cellular phone devices), portable game machines, portable information terminals, or audio reproducing devices. Further, the power storage device can be used in electric propulsion vehicles such as electric vehicles, hybrid electric vehicles, train vehicles, maintenance vehicles, carts, or wheelchairs. Here, as a typical example of the electric propulsion vehicles, a wheelchair is described below.

Figure 6:
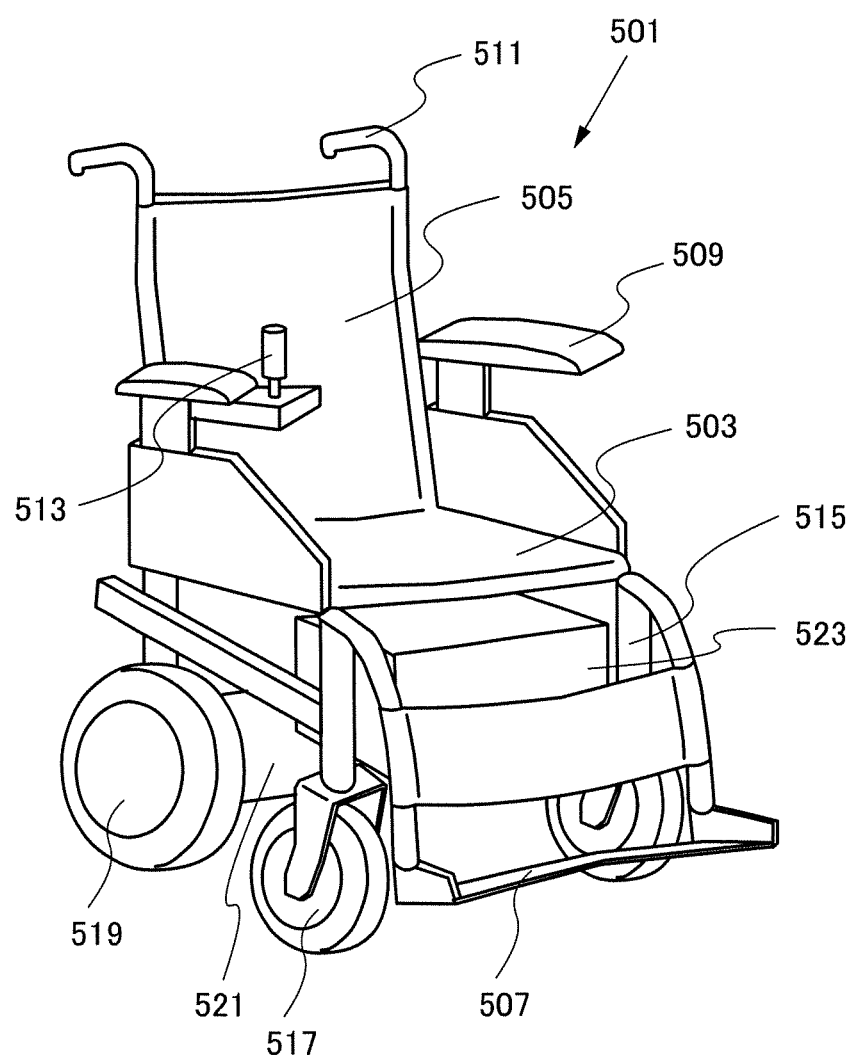
FIG. 6 is a perspective view illustrating an application mode of a power storage device.

FIG. 6 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driving portion 521 having a motor, a brake, a gear, and the like. A control portion 523 including a battery, a power controller, a control means, and the like is provided under the seat 503. The control portion 523 is connected to the controller 513 and the driving portion 521. The driving portion 521 is driven with the control portion 523 by the user operation of the controller 513, so that the operation of moving forward, moving back, turning around, and the like, and the speed of the electric wheelchair 501 are controlled.

The power storage device described in Embodiment 2 can be used as a power source of the control portion 523. The power source of the control portion 523 can be externally charged by electric power supply using plug-in systems or contactless power feeding. Note that in the case where the electric propulsion vehicle is a train vehicle, the train vehicle can be charged by electric power supply from an overhead cable or a conductor rail.

This embodiment can be combined with any other embodiment.

Embodiment 4

In Embodiment 4, an example in which the secondary battery according to one embodiment of the present invention is used in a wireless power feeding system (hereinafter referred to as an RF power feeding system) will be described with reference to block diagrams in FIG. 7 and FIG. 8. In each of the block diagrams, elements of a power receiving device and a power feeding device are classified according to their functions to be illustrated in independent blocks. However, it may be practically difficult to completely separate the elements according to their functions; in some cases, one element may involve a plurality of functions.

Figure 7:
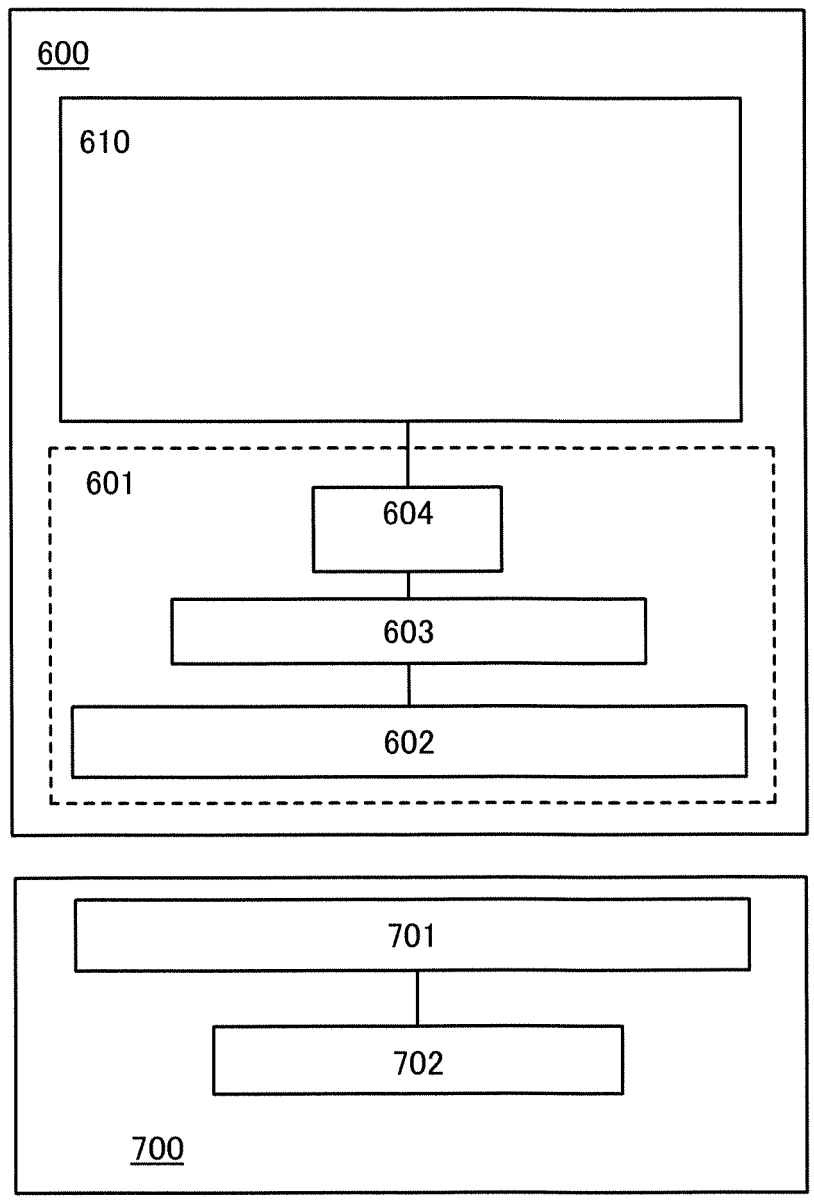
FIG. 7 illustrates a structure of a wireless power feeding system.

First, an RF power feeding system is described using FIG. 7.

A power receiving device 600 is included in an electronic device or an electric propulsion vehicle which is driven by electric power supplied from a power feeding device 700, and can be applied to another device which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicles include electric vehicles, hybrid electric vehicles, train vehicles, maintenance vehicles, carts, wheelchairs, and the like. The power feeding device 700 has a function of supplying electric power to the power receiving device 600.

In FIG. 7, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 or transmitting a signal to the power feeding device antenna circuit 701. The signal processing circuit 603 processes a signal received by the power receiving device antenna circuit 602 and controls charging of the secondary battery 604 and supplying of electric power from the secondary battery 604 to the power load portion 610. In addition, the signal processing circuit 603 controls operation of the power receiving device antenna circuit 602. That is, the signal processing circuit 603 can control the intensity, the frequency, or the like of a signal transmitted from the power receiving device antenna circuit 602. The power load portion 610 is a driving portion which receives electric power from the secondary battery 604 and drives the power receiving device 600. Typical examples of the power load portion 610 include a motor, a driving circuit, and the like. Any other device which drives the power receiving device with electric power received can be used as the power load portion 610 as appropriate. The power feeding device antenna circuit 701 has a function of transmitting a signal to the power receiving device antenna circuit 602 or receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted from the power feeding device antenna circuit 701.

The secondary battery according to one embodiment of the present invention is used as the secondary battery 604 included in the power receiving device 600 in the RF power feeding system illustrated in FIG. 7.

With the use of the secondary battery according to one embodiment of the present invention in the RF power feeding system, the amount of power storage can be larger than that in a conventional secondary battery. Therefore, the time interval of the wireless power feeding can be longer (frequency of power feeding can be reduced).

In addition, with the use of the secondary battery according to one embodiment of the present invention in the RF power feeding system, reduction in size and weight of the power receiving device 600 can be achieved as long as the amount of power storage with which the power load portion 610 can be driven is the same as that in a conventional secondary battery. Therefore, the total cost can be reduced.

Figure 8:
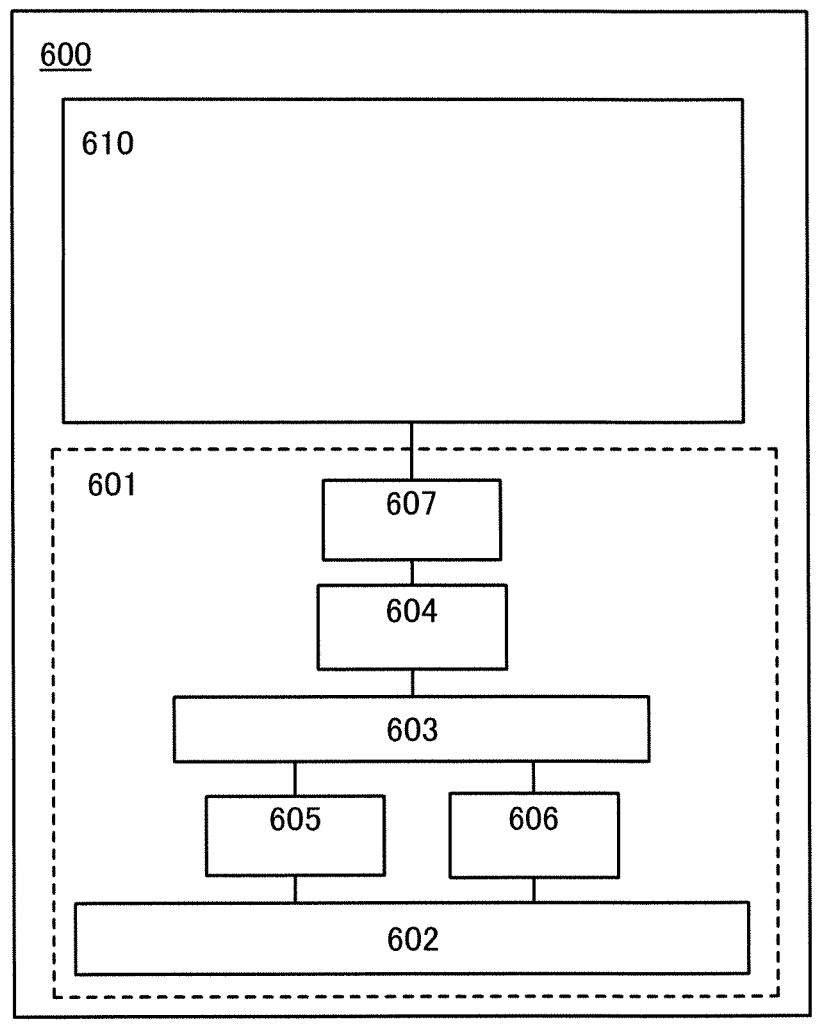
FIG. 8 illustrates a structure of a wireless power feeding system.
Figure 8:
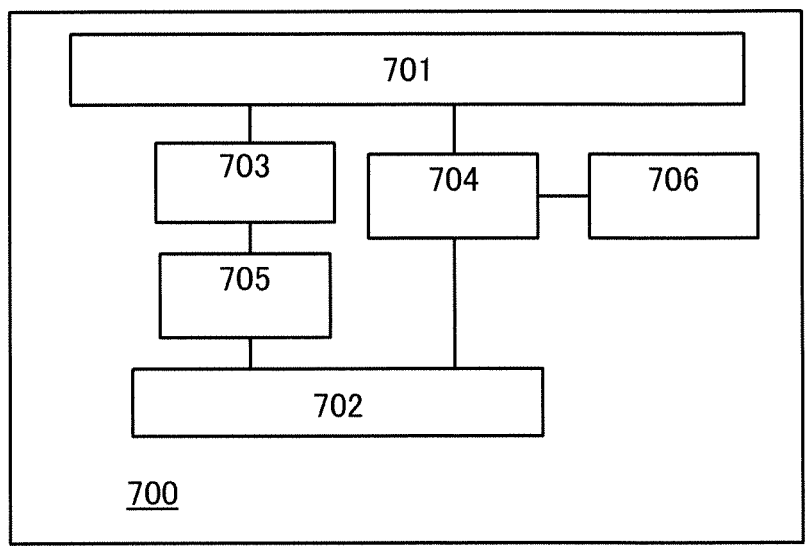

Next, another example of the RF power feeding system is described using FIG. 8.

In FIG. 8, the power receiving device 600 includes a power receiving device portion 601 and a power load portion 610. The power receiving device portion 601 includes at least the power receiving device antenna circuit 602, the signal processing circuit 603, the secondary battery 604, a rectifier circuit 605, a modulation circuit 606, and a power supply circuit 607. The power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted from the power feeding device antenna circuit 701 or transmitting a signal to the power feeding device antenna circuit 701. In the case where the power receiving device antenna circuit 602 receives a signal transmitted from the power feeding device antenna circuit 701, the rectifier circuit 605 has a function of generating DC voltage from the signal received by the power receiving device antenna circuit 602. The signal processing circuit 603 has a function of processing a signal received by the power receiving device antenna circuit 602 and controlling charging of the secondary battery 604 and supplying of electric power from the secondary battery 604 to the power supply circuit 607. The power supply circuit 607 has a function of converting voltage stored in the secondary battery 604 into voltage needed for the power load portion 610. The modulation circuit 606 is used when a response signal is transmitted from the power receiving device 600 to the power feeding device 700.

With the power supply circuit 607, electric power supplied to the power load portion 610 can be controlled. Thus, overvoltage application to the power load portion 610 can be suppressed, and deterioration or breakdown of the power receiving device 600 can be suppressed.

In addition, with the modulation circuit 606, a signal can be transmitted from the power receiving device 600 to the power feeding device 700. Therefore, when the amount of charged power in the power receiving device 600 can be judged as a certain amount charged, a signal is transmitted from the power receiving device 600 to the power feeding device 700 so that power feeding from the power feeding device 700 to the power receiving device 600 can be stopped. As a result, the secondary battery 604 is not completely charged, whereby the number of charge times of the secondary battery 604 can be increased.

The power feeding device antenna circuit 701 has a function of transmitting a signal to the power receiving device antenna circuit 602 or receiving a signal from the power receiving device antenna circuit 602. When a signal is transmitted to the power receiving device antenna circuit 602, the signal processing circuit 702 generates a signal which is transmitted to the power receiving device 600. The oscillator circuit 706 generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. When a signal is received from the power receiving device antenna circuit 602, the rectifier circuit 703 rectifies the received signal. The demodulation circuit 705 extracts the signal transmitted from the power receiving device 600 to the power feeding device 700 from the signal rectified by the rectifier circuit 703. The signal processing circuit 702 has a function of analyzing the signal extracted by the demodulation circuit 705.

Any circuit may be provided between circuits as long as RF power feeding can be performed. For example, after the power receiving device 600 receives a signal and the rectifier circuit 605 generates DC voltage, a circuit such as a DC-DC converter or a regulator that is provided in a subsequent stage may generate constant voltage. Accordingly, overvoltage application to the inside of the power receiving device 600 can be suppressed.

The secondary battery according to one embodiment of the present invention is used as the secondary battery 604 included in the power receiving device 600 in the RF power feeding system illustrated in FIG. 8.

With the use of the secondary battery according to one embodiment of the present invention in the RF power feeding system, the amount of power storage can be larger than that in a conventional secondary battery. Therefore, the time interval of the wireless power feeding can be longer (frequency of power feeding can be reduced).

In addition, with the use of the secondary battery according to one embodiment of the present invention in the RF power feeding system, reduction in size and weight of the power receiving device 600 can be achieved as long as the amount of power storage with which the power load portion 610 can be driven is the same as that in a conventional secondary battery. Therefore, the total cost can be reduced.

In the case where the secondary battery according to one embodiment of the present invention is used in the RF power feeding system and the power receiving device antenna circuit 602 overlaps with the secondary battery 604, it is preferable that the impedance of the power receiving device antenna circuit 602 is not changed by deformation of the secondary battery 604 due to charge and discharge of the secondary battery 604 and deformation of an antenna due to the above-described deformation. This is because a change in the impedance of the antenna might prevent sufficient supplying of electric power. For example, the secondary battery 604 may be contained in a battery pack formed using metal or ceramics. In that case, it is preferable that the power receiving device antenna circuit 602 be away from the battery pack by several tens of micrometers or more.

The frequency of the signal for charging is not particularly limited as long as electric power can be transmitted. For example, the charging signal may have any of an LF band (low-frequency wave) of 135 kHz, an HF band of 13.56 MHz, a UHF band of 900 MHz to 1 GHz, and a microwave band of 2.45 GHz.

A signal transmission method may be selected from various methods including an electromagnetic coupling method, an electromagnetic induction method, a resonance method, and a microwave method, as appropriate. In order to suppress energy loss due to foreign substances containing moisture, such as rain and mud, the electromagnetic induction method or the resonance method using a low frequency band, specifically, very-low frequencies of 3 kHz to 30 kHz, low frequencies of 30 kHz to 300 kHz, medium frequencies of 300 kHz to 3 MHz, or high frequencies of 3 MHz to 30 MHz is preferably used.

This embodiment can be combined with any other embodiment.

EXPLANATION OF REFERENCE

101: current collector; 102: metal layer; 102H: metal layer; 102I: metal layer; 102J: metal layer; 102K: metal layer; 103: active material layer; 103a: crystalline silicon region; 103b: crystalline silicon region; 107a: first mixed region; 107b: second mixed region; 109a: first metal oxide region; 109b: second metal oxide region; 111: current collector; 115: substrate; 151: power storage device; 153: exterior member; 155: power storage cell; 157: terminal portion; 159: terminal portion; 163: negative electrode; 165: positive electrode; 167: separator; 169: electrolyte; 171: negative electrode current collector; 173: negative electrode active material layer; 175: positive electrode current collector; 177: positive electrode active material layer; 201: current collector; 202: metal layer; 207a: first mixed region; 207b: second mixed region; 301: current collector; 302: metal layer; 501: electric wheelchair; 503: seat; 507: footrest; 509: armrest; 511: handle; 513: controller; 515: frame; 517: front wheel; 519: rear wheel; 521: driving portion; 523: control portion; 600: power receiving device; 601: power receiving device portion; 602: power receiving device antenna circuit; 603: signal processing circuit; 604: secondary battery; 605: rectifier circuit; 606: modulation circuit; 607: power supply circuit; 610: power load portion; 700: power feeding device; 701: power feeding device antenna circuit; 702: signal processing circuit; 703: rectifier circuit; 704: modulation circuit; 705: demodulation circuit; 706: oscillator circuit This application is based on Japanese Patent Application serial no. 2010-133467 filed with Japan Patent Office on Jun. 11, 2010, the entire contents of which are hereby incorporated by reference.

The invention claimed is:

1. A power storage device comprising:
a current collector including a first metal element;
a first metal layer over a first region of the current collector;
a second metal layer over a second region of the current collector and provided adjacent to the first metal layer; and
an active material layer over the current collector, the first metal layer, and the second metal layer,
wherein the first metal layer and the second metal layer include a second metal element which is different from the first metal element,
wherein the active material layer includes a first whisker group selectively in a region which overlaps the first metal layer,
wherein the active material layer includes a second whisker group selectively in a region which overlaps the second metal layer,
wherein the first metal layer includes a first mixed region and the second metal layer includes a second mixed region in contact with the active material layer,
wherein each of the first mixed region and the second mixed region comprises silicon and the second metal element, and
wherein the first whisker group and the second whisker group comprise silicon.

2. The power storage device according to claim 1, wherein the second metal element is nickel or titanium.

3. The power storage device according to claim 1, wherein at least one of the first metal layer and the second metal layer is rectangular or conical.

4. An electric device comprising the power storage device according to claim 1.

5. The power storage device according to claim 1, wherein the second metal element is a metal element for promoting crystal growth of the active material layer.

6. The power storage device according to claim 1,
wherein the active material layer comprises an impurity element imparting one conductivity type.

7. A power storage device comprising:
a current collector including a first metal element;
a plurality of metal layers over the current collector, the plurality of metal layers comprising a second metal element which is different from the first metal element; and
an active material layer over the current collector and the plurality of metal layers,
wherein the active material layer includes a whisker group selectively in a region which is in contact with the current collector,
wherein the current collector includes a mixed region,
wherein the mixed region comprises silicon and the first metal element,
wherein the whisker group overlaps the mixed region, and
wherein the whisker group comprises silicon.

8. The power storage device according to claim 7,
wherein the first metal element is nickel or titanium.

9. The power storage device according to claim 7,
wherein at least one of the plurality of metal layers is rectangular or conical.

10. An electric device comprising the power storage device according to claim 7.

11. The power storage device according to claim 7,
wherein the active material layer comprises an impurity element imparting one conductivity type.

12. The power storage device according to claim 7, further comprising a metal oxide region between the mixed region and the active material layer.

13. The power storage device according to claim 12, wherein the metal oxide region comprises an oxide of the first metal element.

14. The power storage device according to claim 7, wherein a region where a crystal is grown in the active material layer is in contact with the current collector.

15. The power storage device according to claim 1,
wherein an interval between the first metal layer and the second metal layer is equal to or greater than 2 times and less than or equal to 4 times as large as respective widths of the first metal layer and the second metal layer.

16. The power storage device according to claim 1, further comprising a first metal oxide region between the first mixed region and the first whisker group and a second metal oxide region between the second mixed region and the second whisker group.

17. The power storage device according to claim 16,
wherein the first metal oxide region and the second metal oxide region comprise an oxide of the second metal element.

18. The power storage device according to claim 7,
wherein a maximum width among the metal layers is equal to or greater than 2 times and less than or equal to 4 times as large as an interval between two of the metal layers, which are adjacent to each other.

19. A power storage device comprising:
a current collector comprising a first metal element, the current collector comprising:
a first region; and
a second region;
an active material layer comprising:
a first region over the first region of the current collector; and
a second region over the second region of the current collector, the second region of the active material layer comprising a whisker group;
a metal layer between the first region of the current collector and the first region of the active material layer or between the second region of the current collector and the second region of the active material layer, the metal layer comprising a second metal element,
wherein one of the second region of the current collector and the metal layer includes a mixed region,
wherein the whisker group overlaps the mixed region,
wherein the mixed region comprises silicon, and the first metal element or the second metal element,
wherein the whisker group and the first region of the active material layer comprise silicon, and
wherein the first metal element is different from the second metal element.

20. The power storage device according to claim 19,
wherein one of the first metal element and the second metal element is nickel or titanium.

21. The power storage device according to claim 19,
wherein at least one of the first region of the current collector and the second region of the current collector is rectangular or conical.

22. The power storage device according to claim 19,
wherein one of the first metal element and the second metal element is a metal element for promoting crystal growth of the second region of the active material layer.

23. The power storage device according to claim 19,
wherein the first region of the active material layer and the second region of the active material layer comprise an impurity element imparting one conductivity type.

24. An electric device comprising the power storage device according to claim 19.

25. The power storage device according to claim 19, further comprising a metal oxide region between the mixed region and the second region of the active material layer.

26. The power storage device according to claim 25,
wherein the metal oxide region comprises an oxide of the first metal element or an oxide of the second metal element.

* * * * *